United States Patent
Ota et al.

(10) Patent No.: US 10,554,105 B2
(45) Date of Patent: Feb. 4, 2020

(54) DRIVE MECHANISM INCLUDING BRUSHED MOTOR

(71) Applicant: Minebea Mitsumi Inc., Nagano (JP)

(72) Inventors: Masami Ota, Tottori (JP); Hiroshi Miyazako, Matsue (JP); Makoto Tanaka, Kurayoshi (JP); Taichi Nakamura, Fukuroi (JP); Akio Takayama, Hamamatsu (JP)

(73) Assignee: MINEBEA MITSUMI INC., Nagano (JP)

( * ) Notice: Subject to any disclaimer, the term of this patent is extended or adjusted under 35 U.S.C. 154(b) by 340 days.

(21) Appl. No.: 15/627,995

(22) Filed: Jun. 20, 2017

(65) Prior Publication Data
US 2017/0373568 A1  Dec. 28, 2017

(30) Foreign Application Priority Data

Jun. 24, 2016 (JP) .................... 2016-125631

(51) Int. Cl.
| | | |
|---|---|---|
| *H01R 39/59* | (2006.01) | |
| *H02K 13/10* | (2006.01) | |
| *H02K 5/14* | (2006.01) | |
| *H02K 5/08* | (2006.01) | |
| *H02K 5/02* | (2006.01) | |
| *H02K 7/116* | (2006.01) | |

(52) U.S. Cl.
CPC ............. *H02K 13/105* (2013.01); *H02K 5/02* (2013.01); *H02K 5/08* (2013.01); *H02K 5/146* (2013.01); *H02K 7/1166* (2013.01); *H01R 39/59* (2013.01)

(58) Field of Classification Search
CPC ............ H02K 5/02; H02K 5/08; H02K 5/146; H02K 13/105; H02K 7/1166; H01R 39/59
See application file for complete search history.

(56) References Cited

U.S. PATENT DOCUMENTS

| | | | |
|---|---|---|---|
| 2009/0322188 A1 | 12/2009 | Yamazaki et al. | |
| 2013/0258695 A1* | 10/2013 | Yamazaki | ............. F21S 41/692 362/513 |

FOREIGN PATENT DOCUMENTS

| | | |
|---|---|---|
| JP | 2008-167537 A | 7/2008 |
| JP | 2009-077520 A | 4/2009 |
| JP | 2011-019388 A | 1/2011 |

OTHER PUBLICATIONS

Japanese Office Action dated Jul. 20, 2018 for corresponding Japanese Application No. 2016-125631 and English translation.

* cited by examiner

*Primary Examiner* — Ramon M Barrera
(74) *Attorney, Agent, or Firm* — Pearne & Gordon LLP (57) ABSTRACT

A drive mechanism including a brushed motor comprises a brushed motor including a commutator having a plurality of commutator segments and a brush contactable to the plurality of commutator segments, a movable member driven by the brushed motor, and a stopper member configured to stop rotation of the brushed motor by contacting the movable member. In a state in which the movable member contacts the stopper member to thereby stop the rotation of the brushed motor, the brush contacts only one of two adjacent commutator segments of the plurality of commutator segments.

4 Claims, 8 Drawing Sheets

FIG.5 t1: START ROTATING
t2: STOP ROTATING
t2 TO t3: FORWARD / REVERSE ROTATION

BEGINNING OF EXTENDING OVER STATE $\theta_s = \theta_b - \theta_a/2 - \theta_a/2$
$= \theta_b - \theta_a$

FIG.11A

ENDING OF EXTENDING OVER STATE $\theta_s = \theta_b - \theta_a/2 - \theta_a/2$
$= \theta_b - \theta_a$

DRIVE MECHANISM INCLUDING BRUSHED MOTOR

CROSS REFERENCE TO RELATED APPLICATIONS

This application claims the benefit of Japanese Patent Application No. 2016-125631, filed Jun. 24, 2016, which is hereby incorporated by reference in its entirety.

BACKGROUND

Technical Field

The present disclosure relates to a drive mechanism including a brushed motor.

Background

A technique using a brushed motor as a means of driving electrical components such as electric mirror storage devices and door lock opening/closing devices (e.g., see JP Unexamined Patent Application Publication No. 2008-167537) is known. There is also knowledge of a malfunction of a brushed motor caused by siloxane contained in fragrances or cosmetics (e.g., see JP Unexamined Patent Application Publication No. 2009-077520). This phenomenon occurs when siloxane, which is organosilicon, is decomposed by electric discharge (spark) produced between a brush of a brushed motor and a commutator into silicon oxide ($SiO_2$), which adheres to the surface of the brush and the commutator. As is well known, silicon oxide has electrical insulating properties. Thus, a silicon oxide film formed on the surface of the brush and the commutator increases the conduction resistance between the brush and the commutator, thereby causing malfunction of the brushed motor.

A brushed motor having a completely sealed structure may be considered as a measure of suppressing the malfunction of the brushed motor due to siloxane. However, such a brushed motor having a completely sealed structure may cause problems such as increase in size, complexity of structure, increase in weight, and increase in cost, and thus is unsuitable for application to actual products.

SUMMARY

The present disclosure is related to providing a technique for suppressing malfunction of the brushed motor.

In accordance with one aspect of the present disclosure, a drive mechanism including a brushed motor comprises a brushed motor including a commutator having a plurality of commutator segments and a brush contactable to the plurality of commutator segments, a movable member driven by the brushed motor, and a stopper member configured to stop rotation of the brushed motor by contacting the movable member, wherein in a state in which the movable member contacts the stopper member to thereby stop the rotation of the brushed motor, the brush contacts only one of two adjacent commutator segments of the plurality of commutator segments.

In accordance with one aspect of the present disclosure, in a state in which the brushed motor rotates and the movable member contacts the stopper member to thereby stop the rotation of the brushed motor, application of a driving voltage to the brush continues for a specific period of time.

In accordance with one aspect of the present disclosure, the plurality of commutator segments is adjacent to each other with a slit therebetween, and in a state in which the movable member contacts the stopper member to thereby stop the rotation of the brushed motor, an opening portion of the slit and the brush are positioned not to overlap with each other when viewed from a direction perpendicular to a rotating shaft.

In accordance with one aspect of the present disclosure, the brush includes a pair of brush segments located at positions sandwiching the commutator, and assuming that a first state is a state in which a straight line passing through a center of rotation of the commutator and a center of the pair of brush segments is orthogonal to one of straight lines connecting a circumferential center of the slit and the center of rotation of the commutator, in a state in which the movable member contacts the stopper member to thereby stop the rotation of the brushed motor, the commutator is located at a position rotated at an angle of less than or equal to θ° relative to the brush with reference to the first state, and provided that:

$$\theta s = (Lb - La)/r,$$

where r: radius of the commutator,

La: virtual arc length of the slit, and

Lb: contact arc length between the brush and the commutator; and $$X = \theta s / (\tfrac{1}{3})\pi = 3(Lb - La)/\pi r,$$

where

X: ratio of θs to ⅙ rotation angle, a value of the angle θ is calculated as follows:

$$\theta = 30° - 60° \times (X/2) \text{ (note: } \theta = 30° \times (1-X) \text{ is also acceptable).}$$

In accordance with one aspect of the present disclosure, the brush includes a pair of brush segments located at positions sandwiching the commutator, and assuming that a first state is a state in which a straight line passing through a rotation center of the commutator and a center of the pair of brush segments is orthogonal to one of straight lines connecting a circumferential center of the slit and the rotation center of the commutator, in a state in which the movable member contacts the stopper member to thereby stop the rotation of the brushed motor, the commutator is located at a position rotated at an angle of less than or equal to 10° relative to the brush with reference to the first state.

In accordance with one aspect of the present disclosure, in a state in which the movable member contacts the stopper member to thereby stop the rotation of the brushed motor, the commutator is located at a position rotated at an angle greater than or equal to 5°, preferably greater than or equal to 7° in a direction of eliminating the overlapping from a critical position where the slit and the brush do not overlap with each other.

The present disclosure can provide a technique for suppressing malfunction of the brushed motor.

DETAILED DESCRIPTION (Outline)

Figure 1:
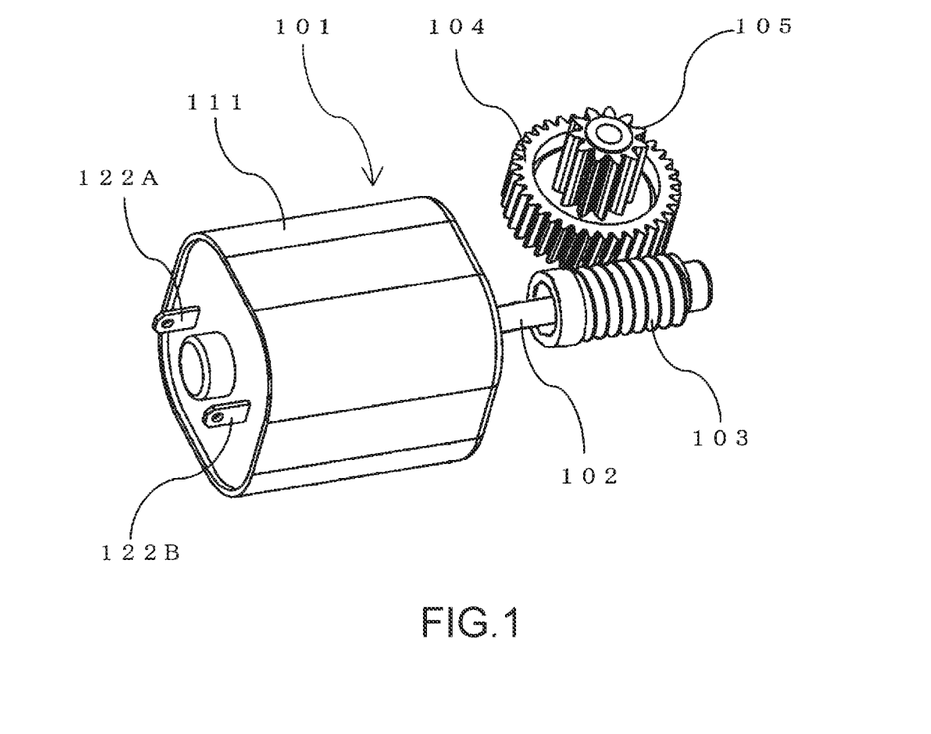
FIG. 1 is a perspective view of a brushed motor of an embodiment of the present disclosure.
Figure 2:
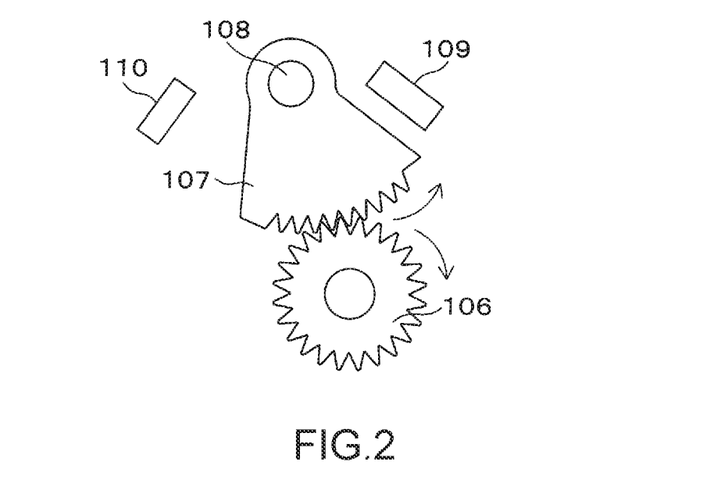
FIG. 2 is an explanatory view explaining a mechanism driven by the brushed motor.

FIGS. 1 and 2 are diagrams showing a part of a drive mechanism including a brushed motor of an embodiment. In this mechanism, a worm gear 103 is attached to a shaft (output shaft) 102 of a brushed motor 101, and a worm wheel 104 meshes with the worm gear 103. The worm wheel 104 has a coaxial structure integrated with the pinion gear 105. The pinion gear 105 meshes with a lock gear 106 shown in FIG. 2, and the lock gear 106 meshes with an engaging portion 107.

The engaging portion 107 has a fan shape, and swings (rotates right and left) about a rotating shaft 108 located at a position of a pivot of the fan shape. Gear teeth that mesh with the lock gear 106 are formed on an arcuate outer periphery of the engaging portion 107. The engaging portion 107 has a swing range which is limited by stoppers 109 and 110. As the shaft 102 of the brushed motor 101 rotates, the worm wheel 104 rotates by being driven by the worm gear 103, and simultaneously the pinion gear 105 rotates. When the pinion gear 105 rotates, the lock gear 106 meshing with the pinion gear 105 rotates and causes the engaging portion 107 to rotate about the rotating shaft 108. The engaging portion 107 has a rotation range limited by stoppers 109 and 110, namely, rotates only within a specific range.

Figure 3:
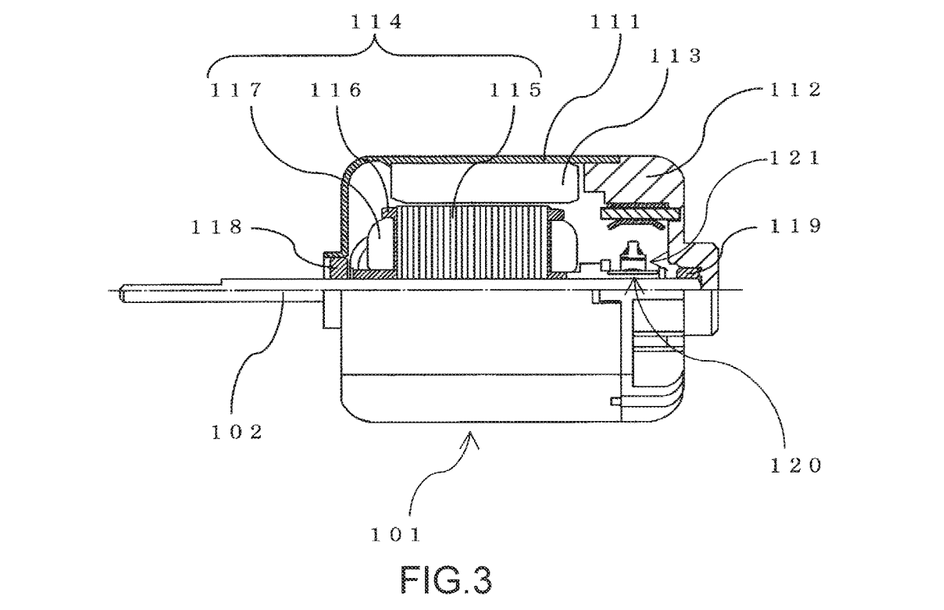
FIG. 3 is a partial sectional view of the brushed motor.

Next, the brushed motor 101 will be described. The brushed motor 101 is illustrated in FIG. 3. The brushed motor 101 includes a bottomed cylindrical outer casing 111. A lid member 112 is coupled to an open portion of the outer casing 111. Two magnets 113 are fixed inside the outer casing 111. One of the magnets 113 is magnetized to the N pole on the shaft center side (on side facing a rotor 114 to be described later), and the other one is magnetized to the S pole on the shaft center side. The magnets 113 have the same structure as in the case of a common brushed motor.

A rotor 114 is disposed inwardly of the magnets 113 so as to be rotatable with respect to the outer casing 111 with a gap therebetween. The rotor 114 has a structure similar to the structure of an ordinary brushed motor and includes an armature core 115, a resin insulator 116 mounted on the armature core 115, and a winding 117 wound around the armature core 115 with the insulator 116 therebetween. The armature core 115 includes three salient poles extending radially from an axial center thereof and has a structure obtained by stacking soft magnetic thin plates such as electromagnetic steel plates.

Figure 4:
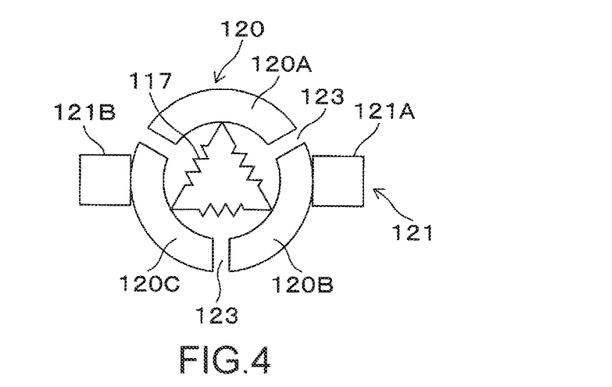
FIG. 4 is an explanatory view illustrating a positional relationship between a commutator and a brush.
Figure 5:
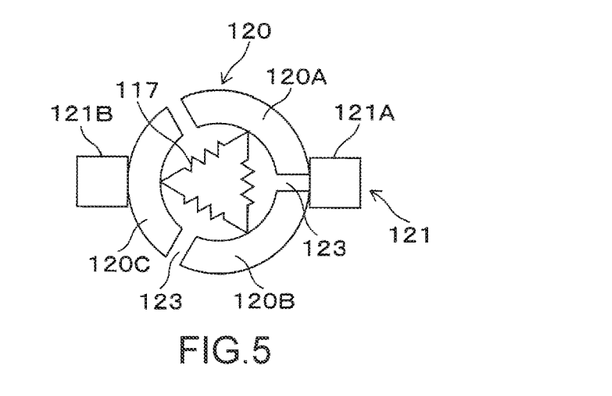
FIG. 5 is an explanatory view illustrating the positional relationship between the commutator and the brush.

The shaft 102 serving as an axis of rotation is fixed at the center of rotation of the armature core 115. A commutator 120 is attached to the shaft 102. FIGS. 4 and 5 are schematic views of the commutator 120 viewed in an axial direction.

The commutator 120 comprises commutator segments 120A, 120B, and 120C arranged along the circumferential direction and contacts the brush 121 in a slidable state. The three commutator segments 120A, 120B, and 120C are separated from each other by slits 123. The brush 121 comprises brush segments 121A and 121B that are located at positions sandwiching the commutator 120.

The shaft 102 is rotatably held in the outer casing 111 by a bearing 118. The shaft 102 is also rotatably held in the lid member 112 by a bearing 119. With this structure, when the armature core 115 rotates, the shaft 102 rotates together with the armature core 115.

The winding 117 forms a rotor coil wound around each salient pole. The winding 117 is connected to the commutator 120. The manner in which the winding 117 and the commutator 120 are electrically connected is the same as that of an ordinary brushed motor. FIGS. 4 and 5 are diagrams showing the positional relationship between the commutator 120 and the brush 121 when viewed in the axial direction. The commutator 120 comprises commutator segments 120A, 120B, and 120C that are disposed at equiangularly spaced positions along a circumferential direction. The winding 117 is connected to each commutator segment. The brush 121 comprises two brush segments 121A and 121B. Each brush segment is fixed to the lid member 112. The brush segment 121A is connected to the electrode terminal 122A shown in FIG. 1, and the brush segment 121B is connected to the electrode terminal 122B shown in FIG. 1. When a positive voltage is applied to one of the electrode terminals 122A and 122B and a negative voltage is applied to the other, the armature core 115 rotates. The function of the commutator 120 and the brush 121 during driving operation is the same as that of an ordinary brushed motor.

(Structural Features)

The mechanism illustrated in FIGS. 1 and 2 is designed to assume only two states while the commutator 120 (rotor 114) is not rotating. Namely, a first state in which the engaging portion 107 (FIG. 2) is in contact with the stopper 109 and a second state in which the engaging portion 107 is in contact with the stopper 110. In other words, while the commutator 120 is at rest, the engaging portion 107 always contacts one of the stoppers 109 and 110, except in the case of failure.

In addition, in the first state and the second state, namely, in the stationary state of the commutator 120, each of the brush segments 121A and 121B contacts only one of the commutator segment 120A, the commutator segment 120B, and the commutator segment 120C. In other words, the mechanism is designed such that, in the first state and the second state, namely, in the stationary state of the commutator 120, two commutator segments do not contact one brush segment at the same time.

Hereinafter, the first and second states will be further described. In the present embodiment, in the stationary state of the commutator 120 (rotor 114), the three slits 123 each disposed between circumferentially adjacent commutator segments are configured so as not to oppose the brush segment 121A and the brush segment 121B. In other words, in the stationary state of the commutator 120, the three slits 123 each disposed between circumferentially adjacent commutator segments when viewed from a direction perpendicular to the axis of rotation are set so as not to overlap with the brush segment 121A and the brush segment 121B. An example of this case is illustrated in FIG. 4. This configuration is achieved by adjusting the gear ratio of the gear mechanism and the position of the stoppers 109 and 110 illustrated in FIGS. 1 and 2.

Note that FIG. 5 illustrates the state in which, in the stationary state of the armature core 115, the commutator segment 120A and the commutator segment 120B are both in contact with the brush segment 121A, and one of the slits 123 opposes the brush segment 121A.

(Analysis of Discharge Phenomena)

Here, the description will focus on the process leading to the configuration of FIG. 4. As described above, a connection failure between the brush and the commutator is caused by a discharge between the brush and the commutator in an atmosphere containing siloxane. Thus, if the discharge can be suppressed, production of a silicon oxide film from siloxane can be suppressed, and the problem of contact failure described above can be suppressed.

Figure 6:
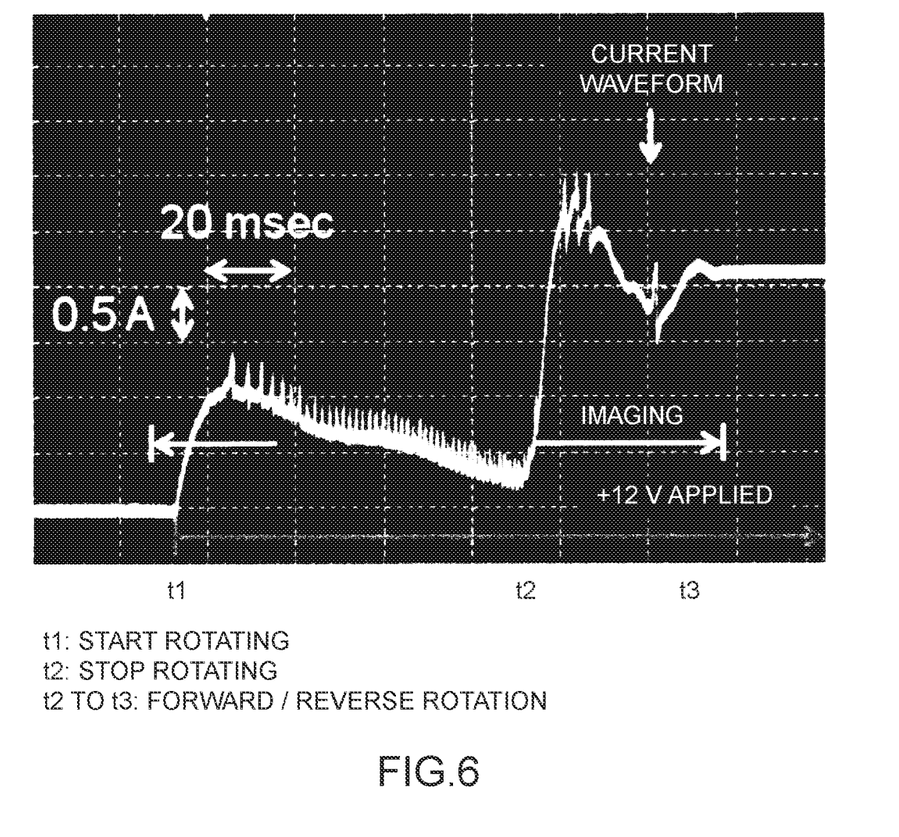
FIG. 6 is a waveform diagram of a current flowing through the brushed motor.

From this viewpoint, the present inventors have analyzed the discharge generated between the brush and the commutator. FIG. 6 is a graph obtained by measuring a current value of a current flowing through the brushed motor 101. In FIG. 6, t1 is the time at which the power supply has been turned on, and t2 is the time at which the engaging portion 107 has come into contact with the stopper 109 (or 110). A swinging phenomenon has been observed in which, even if the engaging portion 107 contacts the stopper 109 (or 110) at t2, the shaft 102 (rotor 114) repeats forward and reverse rotations several times due to the elasticity of the members constituting the gear. The period of time during which the shaft 102 swings is the period between t2 and t3. In the period after t3, the shaft 102 stops swinging, the rotor 114 stops moving, and the driving voltage is applied.

In FIG. 6, spikes are present in the waveform. At a timing corresponding to the spike, a discharge is generated between the commutator 120 and the brush 121. A discharge is also generated during the period between time t1 and time t2 as well as the period between time t2 and time t3. The present inventors have prepared a sample which is the lid member 112 with a hole formed therein, and captured an image of the discharge generated between the commutator 120 and the brush 121 through this hole with a high-speed camera. As a result, it was observed that the discharge generated during the period between time t2 and time t3 was greater than the discharge generated during the period between time t1 and time t2 (that is, greater spark was observed).

The present inventors have prepared a plurality of samples and have observed the samples as described above. The present inventors have found that there are a first sample group in which a discharge was clearly generated during the period between time t2 and time t3; and a second sample group in which a discharge was hardly generated (even if generated, at such a level that is difficult to observe) as illustrated in FIG. 6. Note that no noticeable difference was found between the first sample group and the second sample group regarding the spark generated during the period between time t1 and time t2.

In light of this, the present inventors have carried out an analysis on the difference between the first sample group and the second sample group, and have discovered the following facts.

(1) First Sample Group (Sample group in which a noticeable discharge was generated during the period between time t2 and time t3)

With the first sample group, in a state where the commutator 120 (rotor 114) is stationary, namely, in a state where the engaging member 107 is in contact with the stopper 109 or 110, the positional relationship between the commutator 120 and the brush 121 is as shown in FIG. 5 (or in a state close to FIG. 5).

(2) Second Sample Group (Sample group in which a discharge was unnoticeable during the period between time t2 and time t3)

In the second sample group, in a state where the commutator 120 (rotor 114) is stationary, namely, when the engaging member 107 contacts the stopper 109 or 110, the positional relationship between the commutator 120 and the brush 121 is as shown in FIG. 4 (or in a state close to FIG. 4).

Figure 7A:
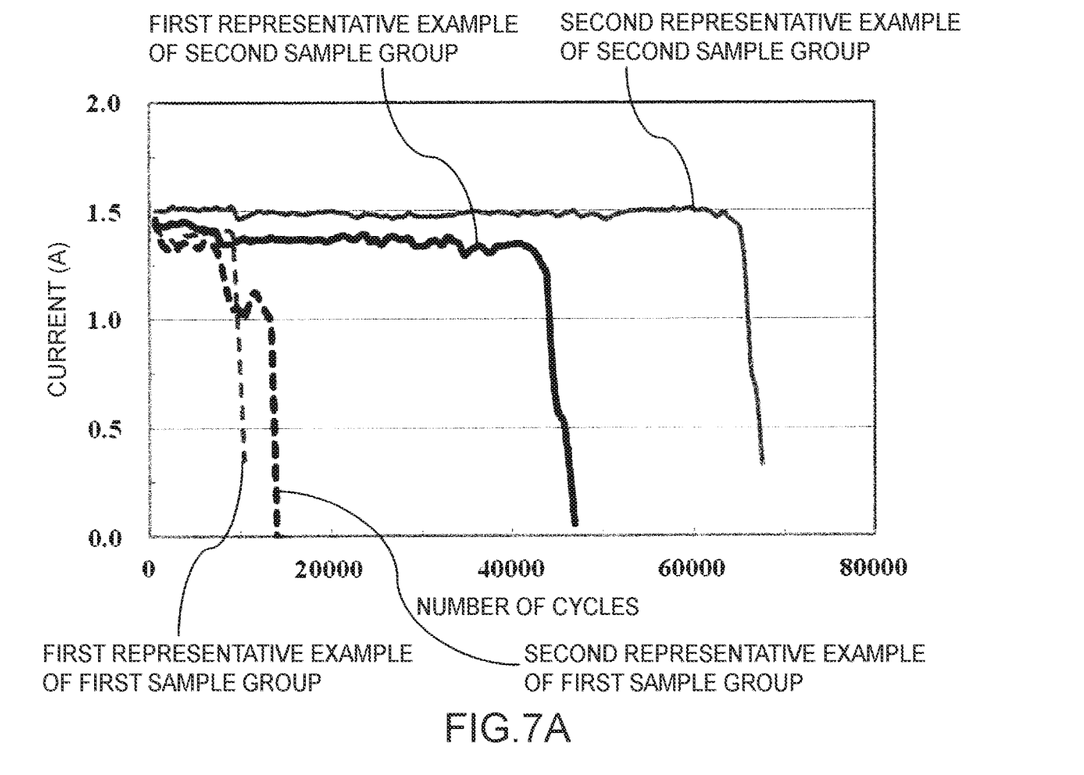
FIG. 7A is a graph illustrating the results of an endurance test.

FIG. 7A is a graph showing the results of an endurance test of representative examples of the first sample group and representative examples of the second sample group. In the endurance test, the motor was repeatedly driven under the endurance test conditions shown in FIG. 7B in an atmosphere having a humidity of 100% and saturated with siloxane. In FIG. 7A, the vertical axis indicates a current value of the current that flows during driving. When the electrical contact between the brush and the commutator becomes worse, an electric resistance of a current supply path to the winding 117 of the armature core (rotor) increases, and thus the current value indicated on the vertical axis of FIG. 7A decreases.

As can be seen in FIG. 7A, the second sample group has much higher endurance than the first sample group. With a focus on discharge phenomena, the difference between the first sample group and the second sample group lies in the presence or absence (noticeable or unnoticeable) of a discharge generated during the period between time t2 and time t3 in FIG. 6 described above. Therefore, it is concluded that the discharge generated during the period between time t2 and time t3 in FIG. 6 is a major cause of worsening of endurance.

Note that the difference between the first representative example and the second representative example lies in the presence or absence of a current limiting device incorporated in the power supply system (present in the first representative example and absent in the second representative example). The reason for low endurance of a sample having a current limiting device is unknown.

(Mechanism of Discharge Generation)

Hereinafter, the description will focus on a mechanism in which the discharge generated during the period between time t2 and time t3 in FIG. 6 has an adverse effect on the electrical contact between the brush and the commutator. As described above, between time t2 and time t3, the commutator 120 swings by repeating normal and reverse rotations. This swinging is mainly caused by elastic deformation of the gear system.

In the state of FIG. 5, the swinging (swinging of the commutator 120 relative to the brush 121) changes the contact state of the commutator segment 120A and the commutator segment 120B relative to the brush segment 121A. An unstable contact that fluctuates in this process is caused. Note that at this stage, since a voltage is applied between the commutator segment 120A and the commutator segment 120B, a discharge is generated at a portion where a potential difference has occurred due to the unstable contact. The discharge is caused by the driving voltage and is generated when the commutator 120 swings more slowly than during normal rotation. Thus, the discharge interval is longer than the discharge interval between time t1 and time t2 (FIG. 6), and accordingly the energy discharged is greater than the energy discharged between time t1 and time t2. This can also be seen from the waveform of FIG. 6. Thus, siloxane is easily decomposed efficiently by this discharge, and a silicon oxide film due to siloxane is likely to be formed on a contact surface between the commutator 120 and the brush 121. Therefore, as illustrated in FIG. 7A, the endurance of the first sample group is lower than the endurance of the second sample group.

Meanwhile, in the second sample group, all three of the slits 123 each provided between the adjacent commutator segments are separate from the brush segments while at rest. Thus, a phenomenon between time t2 and time t3 shown in FIG. 6 in which the vicinity of the slits 123 comes into contact with the brush segment 121A and the brush segment 121B while swinging does not occur. Therefore, a strong discharge is not generated, and thus formation of a silicon oxide film due to siloxane is suppressed and high endurance illustrated in FIG. 7A can be obtained.

(Empirical Data)

Figure 8A:
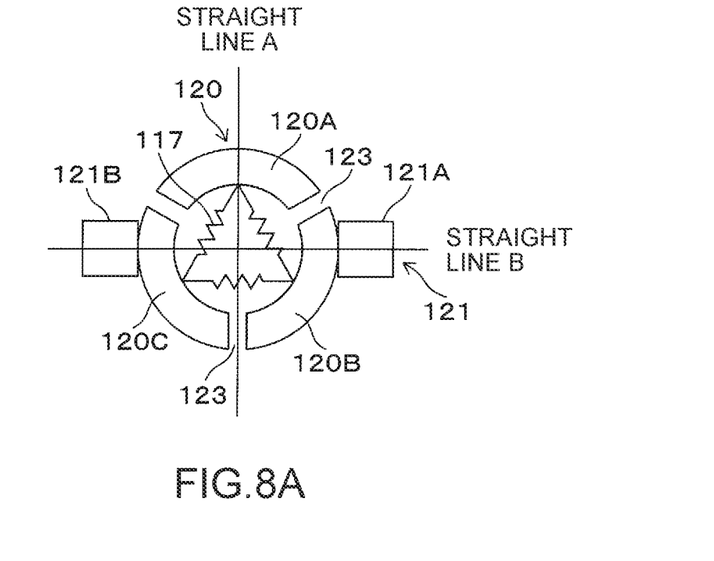
FIGS. 8A and 8B are explanatory views illustrating the positional relationship between the commutator and the brush.
Figure 8B:
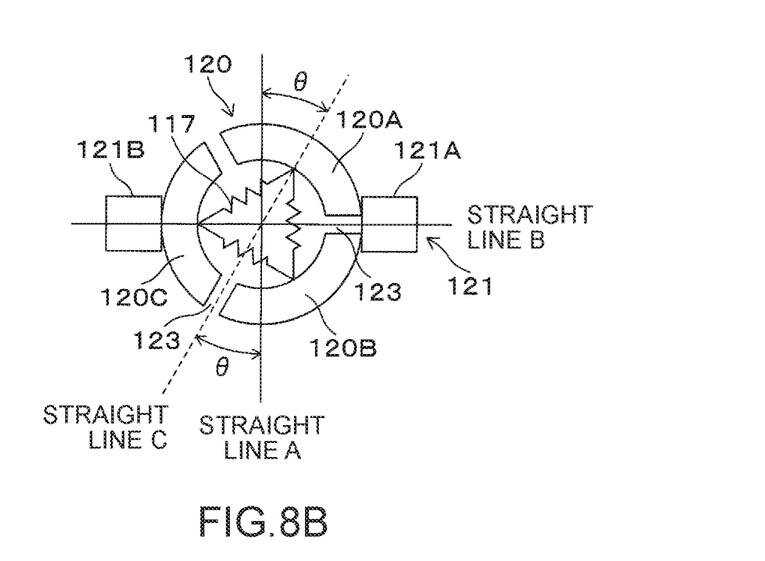

The description will be made on the results of studies on how the positional relationship between the slits 123 and the brush segments 121A and 121B shown in FIGS. 4 and 5 is correlated with endurance. FIGS. 8A and 8B are diagrams illustrating the positional relationship between the commutator 120 and the brush 121 in a state where the rotor 114 has stopped rotating (a state in which the engaging portion 107 is in contact with the stopper 109 or 110 in FIG. 2) and in a state where the rotor 114 is rotating. The difference between FIG. 8A and FIG. 8B resides in the positional relationship between the commutator 120 and the brush 121 in a state where the rotor 114 is not rotating.

FIG. 8A is a diagram illustrating a state in which a straight line A passing through the center of rotation of the rotor 114 (commutator 120) and a center of one of the slits 123 is orthogonal to a straight line B passing through the centers of the brush segment 121A and 121B. In the state shown in FIG. 8A, the three slits 123 are located at positions farthest from the brush segments 121A and 121B.

FIG. 8B illustrates a state in which the rotor 114 has been rotated clockwise through 30° from the state shown in FIG. 8A. In FIG. 8B, one of the slits 123 faces the brush segment 121A (brush segment 121A extends over the slit 123). A straight line C in FIG. 8B indicates that the straight line A in FIG. 8A has been rotated through 30° in the clockwise direction. In the case of FIG. 8B, an angle θ between the straight line A and the straight line C is 30°.

Figure 7B:
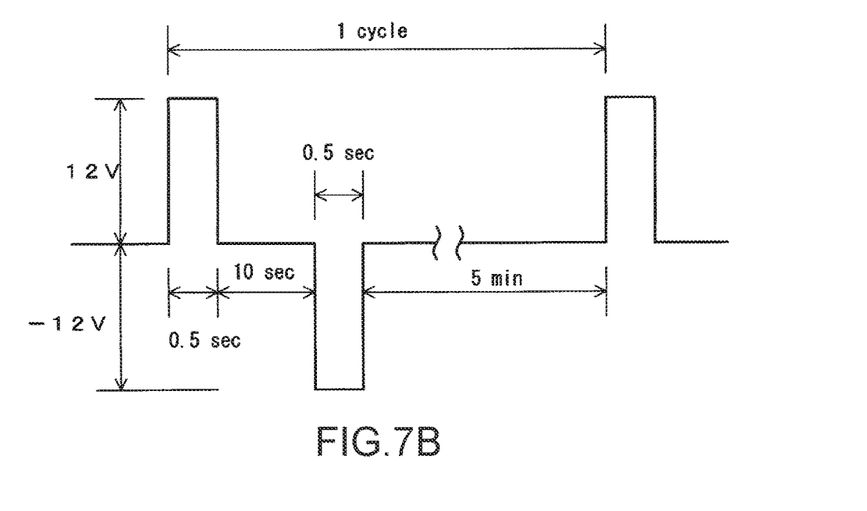
FIG. 7B is a diagram showing endurance test conditions.
Figure 9A:
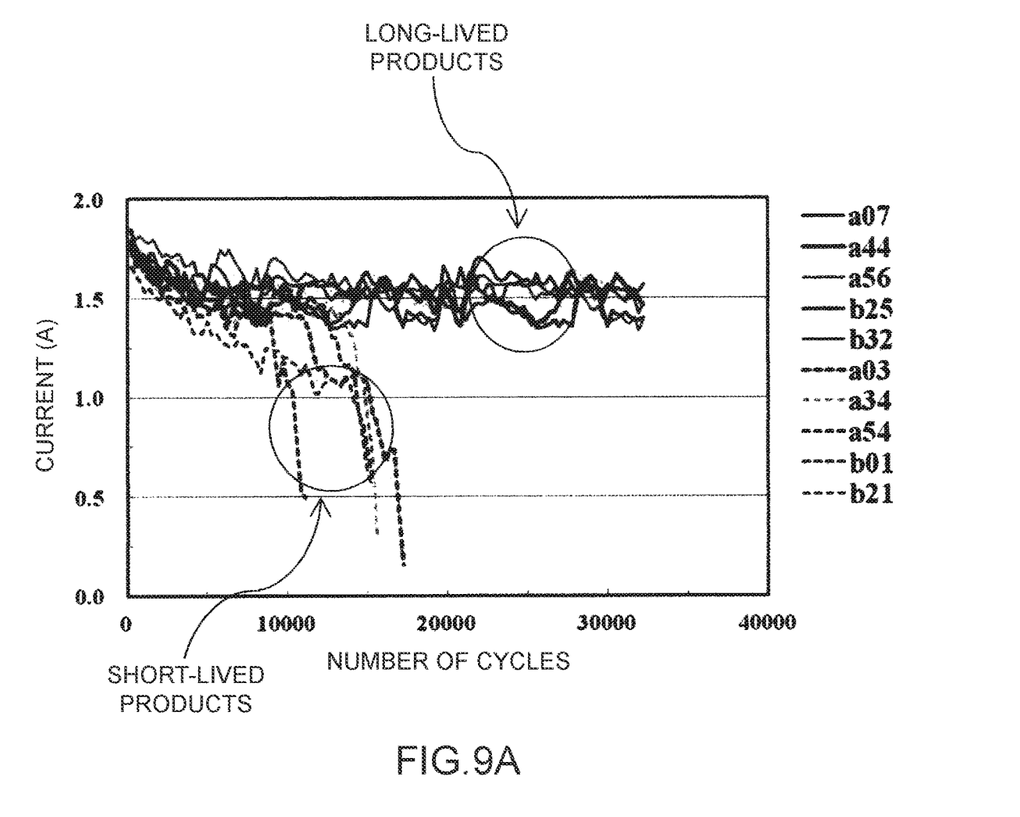
FIGS. 9A and 9B are graphs illustrating results of an endurance test.
Figure 9B:
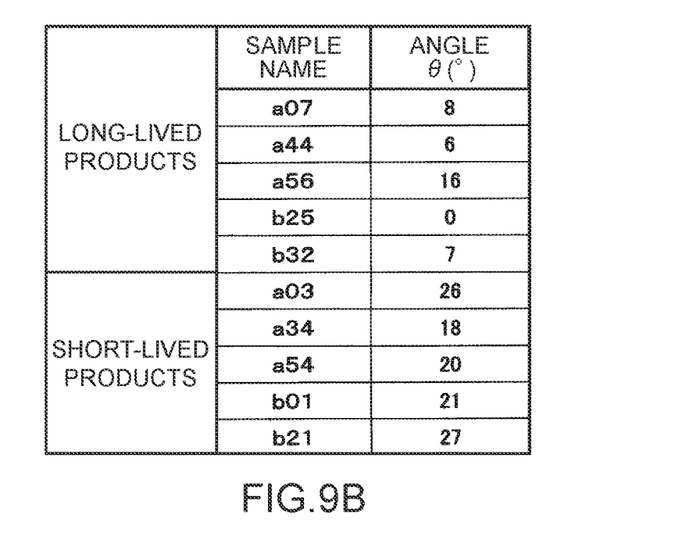

Here, samples were prepared with the value of the angle θ being varied between 0 and 30°, and the same endurance tests as in the case of FIGS. 7A and 7B were carried out on the samples. The results are illustrated in FIGS. 9A and 9B. As is apparent from FIGS. 9A and 9B, there is a clear correlation between angle θ and endurance. In general, it can be clearly seen that samples with a smaller angle θ have a long life and samples with a larger angle θ have a short life.

These results confirm that the closer to 30° the angle θ is, the closer to the state of FIG. 8B, which confirms that the possibility of generation of a discharge having a large adverse effect on endurance as described above under the subtitle "Mechanism of discharge generation" may increase. Note that samples a56 and a34 have an angle θ of similar values (a56: θ=16° and a34: θ=18°), but sample a56 is a product having a long life and sample a34 is a product having a short life. This fact suggests that there is a possibility that a threshold at which a discharge having a large adverse effect on endurance as described under the subtitle "Mechanism of discharge generation" is generated at an angle θ of around 16° to 18°.

(Model Under Consideration)

Figure 10:
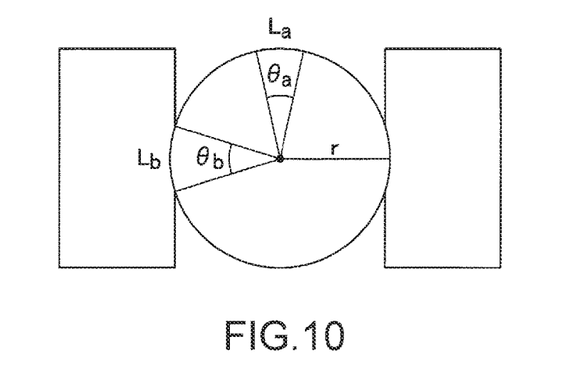
FIG. 10 is an explanatory view illustrating the positional relationship between the commutator and the brush.
Figure 11A:
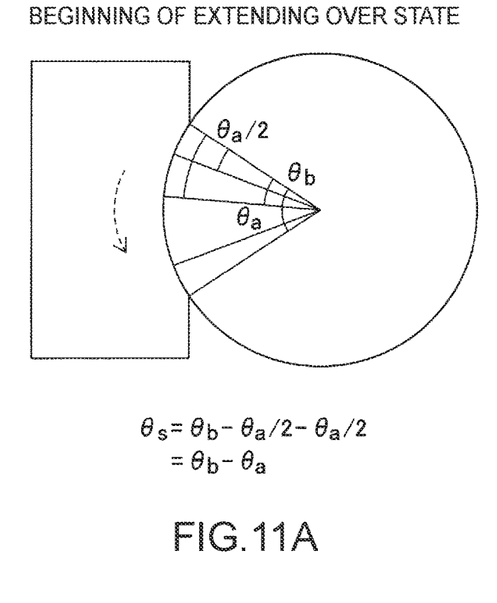
FIGS. 11A and 11B are explanatory views illustrating the positional relationship between the commutator and the brush.
Figure 11B:
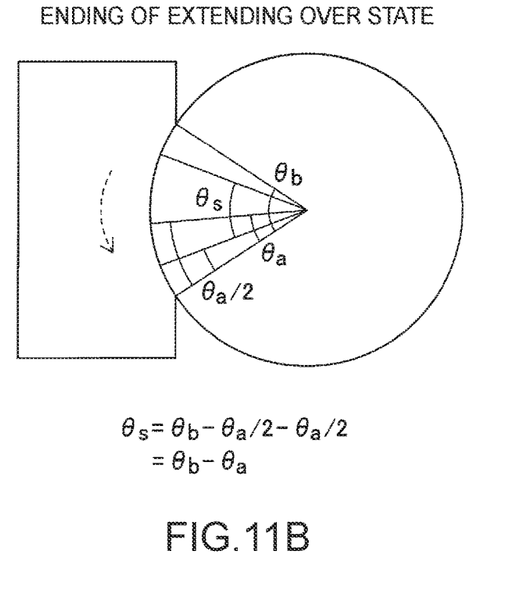

Hereinafter, description will be made of the results of a theoretical consideration on a threshold value of angle θ. Using a model illustrated in FIGS. 10, 11A and 11B, the present inventors have studied the conditions under which the brush segment 121A or 121B extends over the slit 123. Herein, a formula for obtaining X was derived as follows.

It is assumed that the commutator 120 and the brush 121 are in line contact on a circular arc. Provided that, r: radius of the commutator;
La: length of a virtual arc of the slit;
θa: central angle of the virtual arc of the slit;
Lb: length of an arc where the brush and the commutator are in contact; and
θb: central angle of the arc where the brush and the commutator are in contact, and from a formula using radians, $$La=r\theta a, Lb=r\theta b,$$

an angle θs for which one of the brushes extends over one of the slits is expressed as:

$$\theta s = \theta b - \theta a = (Lb-La)/r,$$

and a ratio X of θs to an angle of rotation corresponding to ⅙ rotation is expressed as:

$$X=\theta s/(\frac{1}{3})\pi=3(Lb-La)/\pi r.$$

If there is no wear at a contact surface between the commutator 120 and the brush 121, the contact between the commutator 120 and the brush 121 is a line contact. In such a case, θb=2θa. For the samples for which data shown in FIGS. 9A and 9B is obtained, r=1.75 mm, La=0.80 mm, and Lb=1.6 mm, and thus the angle range θs through which the brush segment extends over the slit 123 in a range of 60° is, from the above equation, θs=26°.

Figure 12:
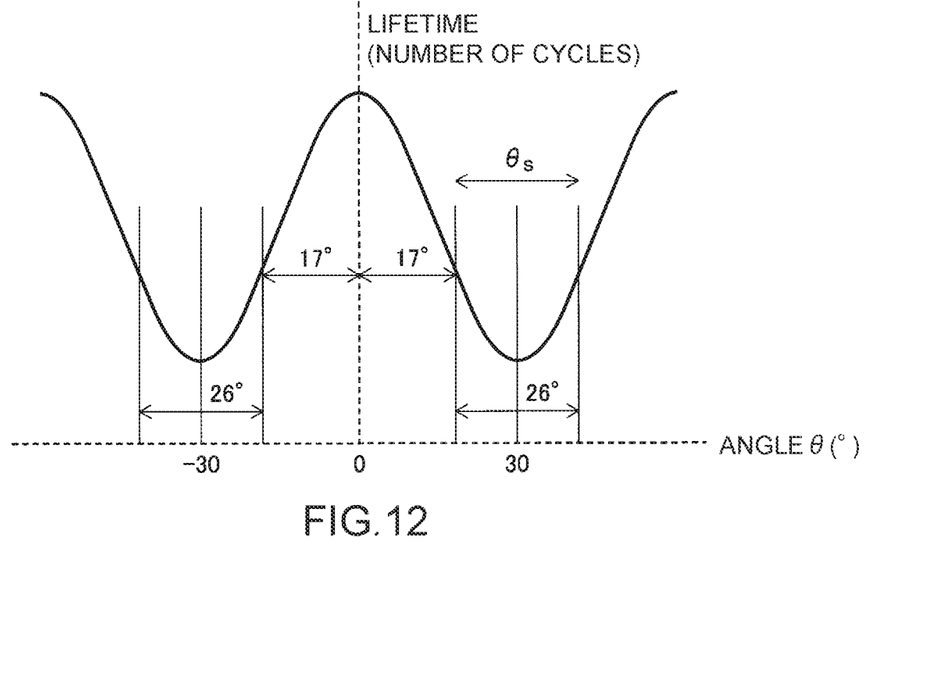
FIG. 12 is a graph illustrating conditions preventing the slit of the commutator from bridging the brush.

FIG. 12 illustrates the relationship between the lifetime obtained from the above described model under consideration and the angle θ in FIG. 8B. It can be seen from FIG. 12 that θ of around 17° is a threshold between long life and short life. This is consistent with the data in FIG. 9 suggesting that a border between long life and short life exists at θ of around 16° to 18°. In addition, FIG. 12 also shows that endurance is at the lowest at θ=30°, and this result is also consistent with what has been described under the subtitle "Mechanism of discharge generation". Note that as the wear progresses at the contact surface between the commutator 120 and the brush 121, both are in surface contact with each other, leading an increase in the value of X.

(Preferred Embodiment)

Description will be made on a preferred range of θ obtained from the above described empirical data and what has been considered above. The allowable value (maximum value) of θ in FIG. 8B can be obtained by θ=30°−60°×(X/2) from the relationship in FIG. 12. Estimating that an effect of wear is about 10%, an angle range θ' in which a wear margin of θ is taken into consideration is 0.90, that is, θ'=0.9×(30°−60°×(X/2)).

Generally, from the relationship in FIG. 12, if the whole mechanism is designed such that θ≤10° (−10°≤θ≤10° with plus/minus signs), even if wear of the electrode occurs, in the stationary state of the rotor 114, the brush 121 does not extend over the slit 123. Thus, the generation of a strong discharge described under the subtitle "Mechanism of discharge generation" can be suppressed. In addition, the formation of a silicon oxide film due to a strong discharge on an electrode surface and can enhance the endurance of the brushed motor.

The preferred embodiment is expressed as follows. First, a state in FIG. 8A, namely, a state in which a straight line passing through the center of rotation of the commutator 120 and the centers of the brush segments 121A and 121B (a straight line passing through the center of rotation and orthogonal to the straight line A) is orthogonal to one of the straight lines connecting the center in a circumferential direction of the slit 123 and the center of rotation of the commutator 120 (straight line A) is referred to as a first state (a state shown in FIG. 8A). Here, a state is considered in which the movable member (engaging portion 107) has come into contact with the stopper member 109 or 110 and the rotation of the brushed motor 101 has stopped. In this state, the commutator 120 is located at a position rotated through an angle of less than or equal to θ° relative to the brush 121 with reference to the first state (a state shown in FIG. 8A). Provided that:

$$\theta s=(Lb-La)/r;$$

where
r: radius of the commutator 120,
La: virtual arc length of the slit 123, and
Lb: contact arc length between the brush 121 and the commutator 120; and $$X=\theta s/(\tfrac{1}{3})\pi=3(Lb-La)/\pi r;$$

where
X: ratio of θs to ⅙ rotation angle,
the preferred value of the angle θ is calculated as follows:

$$\theta=30°-60°\times(X/2).$$

Generally, it is preferable to have a structure in which the angle θ is less than or equal to 10° to give a margin.

In addition, it is also preferable to have a structure in which in the stationary state of the commutator 120, the commutator 120 is located at a position rotated through an angle of greater than or equal to 5°, preferably greater than or equal to 7° in a direction in which the overlapping is eliminated, from a critical position where the slit 123 and the brush 121 do not overlap with each other (a position where the overlapping occurs when the commutator 120 is further moved). With such a margin, a state in which the brush segment 121A or 121B extends over the slit 123 after time t2 in FIG. 6 can be avoided, and the discharge between the commutator 120 and the brush 121 can be suppressed.

(Application Examples)

For example, the mechanism illustrated in FIGS. 1 and 2 is used for a door lock mechanism of an automobile. In this case, the mechanism is designed such that the door lock is turned ON in a state in which the engaging portion 107 contacts the stopper 109, and the door lock is turned OFF in a state in which the engaging portion 107 contacts the stopper 110. Specifically, the engaging portion 107 engages with an actuator member that performs door locking, and the actuator moves forward and backward in accordance with the rotation of the engaging portion 107. For example, when the actuator moves forward, the movable portion of the door lock is pushed and the state of the door lock is changed from OFF to ON, and when the actuator moves backward, the movable portion of the door lock is pulled and the state of the door lock is changed from ON to OFF.

In the case of the above door lock mechanism, in the stationary state of the brushed motor 101, the door lock takes only one of the two states of ON and OFF. In other words, in the stationary state of the brushed motor 101, the door lock is always in one of the ON and OFF states. More specifically, the stationary state of the engaging portion 107 is always either in a first state (door lock is ON) in which the engaging portion 107 is in contact with the stopper 109 or in a second state (door lock is OFF) in which the engaging portion 107 is in contact with the stopper 110.

Here, the whole mechanism is designed such that in the state in which the engaging portion 107 is in contact with the stopper 109 and in the state in which the engaging portion 107 is in contact with the stopper 110, the commutator 120 and the brush 121 are positioned to have a positional relationship as illustrated in FIG. 4 (FIG. 8A). Note that the relative positional relationship between the commutator 120 and the brush 121 in the state in which the engaging portion 107 is in contact with the stopper 109 and in the state in which the engaging portion 107 is in contact with the stopper 110 may be shifted from the positional relationship illustrated in FIG. 4 (FIG. 8A). In this case, the shift angle indicated by the angle θ in FIG. 8B from the state shown in FIG. 8A should be an angle calculated by the above described expression θ=30°−60°×(X/2) or simply an angle of less than or equal to 10°. Alternatively, in the stationary state of the commutator 120, the commutator 120 should be located at a position rotated through an angle of greater than or equal to 5°, preferably greater than or equal to 7° in a direction in which the overlapping is eliminated, from the critical position (a position where the overlapping occurs when the commutator 120 is further moved) where the slit 123 and the brush 121 do not overlap with each other.

What is important is that in the stationary state of the commutator 120, the positional relationship is determined such that the brush segment 121A or 121B does not extend over the slit 123, or the slit 123 does not overlap with the brush segment 121A or 121B when viewed from a direction perpendicular to the axis of rotation. Note that FIG. 8B shows the state in which the shift angle θ from the state in FIG. 8A is 30°, the slit 123 faces the brush segment 121A, and the brush segment 121A extends over the slit 123. In a state in which the engaging portion 107 is in contact with the stopper 109 and in a state in which the engaging portion 107 is in contact with the stopper 110, it is important to prevent the positional relationship shown in FIG. 8B. Note that the rotational direction of the shift angle θ may be a direction opposite to the rotational direction shown in FIGS. 8A and 8B, namely, a structure in which the commutator 120 is rotated (shifted) in a counterclockwise direction through an angle of, for example, less than or equal to 10° from the state shown in FIG. 8A.

Hereinafter, an example of a specific operation of the door lock mechanism will be described. First, a state is considered in which the door lock switch is OFF (a state in which the engaging portion 107 contacts the stopper 110). When the door lock switch is turned ON in this state, the brushed motor 101 rotates so that the engaging portion 107 rotates counterclockwise in FIG. 2 and the engaging portion 107 starts to rotate toward the stopper 109 from the state where it is in contact with the stopper 110. When the engaging portion 107 contacts the stopper 109, the engaging portion 107 stops rotating counterclockwise. In the process of movement of the engaging portion 107, the door lock is mechanically switched from OFF to ON by the movement of the engaging portion 107. In addition, when the brushed motor 101 is rotated in an opposite direction to that the direction described above, the door lock is mechanically switched from ON to OFF.

With this mechanism, in order to ensure reliable switching of the door lock, a driving voltage is applied to the brushed motor 101 so that the brushed motor 101 can continue to operate for a certain period of time. Thus, the driving voltage continues to be applied to the brushed motor 101 after the engaging portion 107 has been rotated from the stopper 109 to the stopper 110 and has come into contact with the stopper 110. In addition, the driving voltage continues to be applied to the brushed motor 101 after the engaging portion 107 has been rotated from the stopper 110 to the stopper 109 and has come into contact with the stopper 109.

The application period of the drive voltage is preset, and an overcurrent limiting device or the like functions to prevent the driving voltage from being applied for a long period of time in a state in which the engaging portion 107 cannot move. However, the drive voltage continues to be applied to the brushed motor 101 for a period of several tens to hundreds of milliseconds from the moment when the engaging portion 107 cannot move.

Thus, with the structure that arrives at the state in FIG. 5 or FIG. 8B when the engaging portion 107 is at rest, an occurrence of a discharge between the commutator and the brush after time t2 illustrated in FIG. 6 cannot be prevented. In contrast to this, with the structure that arrives at the state in FIG. 4 or FIG. 8A when the engaging portion 107 is at rest, an occurrence of a discharge after time t2 illustrated in FIG. 6 can be suppressed. In this case, the endurance of the brushed motor as illustrated in FIGS. 7A, 7B, 9A and 9B can be enhanced.

For example, the interior of a car such as a passenger car tends to have an atmosphere containing siloxane due to fragrances and cosmetics, or may have an atmosphere containing siloxane. Thus, a drive mechanism including a brush motor according to present disclosure is useful.

(Others)

The present disclosure is not limited to the application to the driving mechanism for a door lock of a car. The present disclosure can be used as a technique for suppressing a discharge from occurring between a commutator and a brush of a brushed motor in various drive mechanisms including the brushed motor. Note that the cause of a trouble caused by the discharge is not limited to siloxane.

What is claimed is:

1. A drive mechanism including a brushed motor comprising:
    a brushed motor including a commutator having a plurality of commutator segments and a brush contactable to the plurality of commutator segments;
    a movable member driven by the brushed motor; and
    a stopper member configured to stop rotation of the brushed motor by contacting the movable member, wherein
    in a state in which the movable member contacts the stopper member to thereby stop the rotation of the brushed motor, the brush contacts only one of two adjacent commutator segments of the plurality of commutator segments,
    the plurality of commutator segments is adjacent to each other with a slit therebetween,
    the brush includes a pair of brush segments located at positions sandwiching the commutator,
    assuming that a first state is to a state in which a straight line passing through a center of rotation of the commutator and a center of the pair of brush segments is orthogonal to one of straight lines connecting a circumferential center of the slit and the center of rotation of the commutator,
    in a state in which the movable member contacts the stopper member to thereby stop the rotation of the brushed motor, an opening portion of the slit and the brush are positioned not to overlap with each other when viewed from a direction perpendicular to an axis of rotation, and
    the commutator is located at a position rotated at an angle of less than or equal to 10 degree relative to the brush with reference to the first state.

2. The drive mechanism including a brushed motor according to claim 1, wherein in a state in which the brushed motor rotates and the movable member contacts the stopper member to thereby stop the rotation of the brushed motor, application of a driving voltage to the brush continues for a specific period of time.

3. The drive mechanism including a brushed motor according to claim 1, wherein
    the brush includes a pair of brush segments located at positions sandwiching the commutator; and
    assuming that a first state is a state in which a straight line passing through a center of rotation of the commutator and a center of the pair of brush segments is orthogonal to one of straight lines connecting a circumferential center of the slit and the center of rotation of the commutator,
    in a state in which the movable member contacts the stopper member to thereby stop the rotation of the brushed motor,
    the commutator is located at a position rotated at an angle of less than or equal to $\theta°$ relative to the brush with reference to the first state, and provided that:

$\theta s=(Lb-La)/r;$ where
    r: radius of the commutator,
    La: length of a virtual arc of the slit, and
    Lb: length of contact arc between the brush and the commutator; and $X=\theta s/(1/3)\pi=3(Lb-La)/\pi r;$ where
    X: ratio of $\theta s$ to 1/6 rotation angle,
    a value of the angle $\theta$ is calculated as follows:

$\theta=30°-60°\times(X/2).$

4. The drive mechanism including a brushed motor according to claim 1, wherein
    in a state in which the movable member contacts the stopper member to thereby stop the rotation of the brushed motor,
    the commutator is located at a position rotated at an angle of greater than or equal to 5° in a direction of eliminating the overlapping from a critical position where the slit and the brush do not overlap with each other.

* * * * *